United States Patent
McSchooler

(10) Patent No.: US 8,909,474 B2
(45) Date of Patent: Dec. 9, 2014

(54) METHODS AND APPARATUS FOR SOCIOECONOMIC ROUTING IN NAVIGATION SYSTEMS

(71) Applicant: EchoStar Broadcasting Corporation, Englewood, CO (US)

(72) Inventor: Jeffrey McSchooler, Parker, CO (US)

(73) Assignee: EchoStar Broadcasting Corporation, Englewood, CO (US)

( * ) Notice: Subject to any disclaimer, the term of this patent is extended or adjusted under 35 U.S.C. 154(b) by 0 days.

(21) Appl. No.: 13/726,780

(22) Filed: Dec. 26, 2012

(65) Prior Publication Data

US 2014/0180586 A1 Jun. 26, 2014

(51) Int. Cl.
*G01C 21/34* (2006.01)
*G06Q 10/04* (2012.01)
*G06Q 50/30* (2012.01)

(52) U.S. Cl.
CPC .......... *G01C 21/3461* (2013.01); *G06Q 10/047* (2013.01); *G06Q 50/30* (2013.01)
USPC ....................................................... 701/533

(58) Field of Classification Search
USPC ....................................................... 701/533
See application file for complete search history.

(56) References Cited

U.S. PATENT DOCUMENTS

| 2010/0057340 A1* | 3/2010 | Kravets et al. | 701/201 |
| 2012/0191338 A1* | 7/2012 | French et al. | 701/400 |
| 2013/0013198 A1* | 1/2013 | Adrain | 701/468 |

OTHER PUBLICATIONS

European Patent Office, Extended European Search Report, dated Feb. 26, 2014 for European Patent Application No. 13198263.9.
European Patent Application, Notice from the European Patent Office dated Oct. 1, 2007 concerning business methods, for European Patent Application No. 13198263.9.

* cited by examiner

*Primary Examiner* — James Trammell
*Assistant Examiner* — Michael D Lang
(74) *Attorney, Agent, or Firm* — Ingrassia Fisher & Lorenz, P.C.

(57) ABSTRACT

In connection with a navigation system, a method of providing routing information to a user includes receiving user location information associated with a residence of the user, determining a socioeconomic routing preference based on a socioeconomic status associated with the user location information, and calculating a route between a start location and an end location based on the socioeconomic routing preference. Route guidance is then provided to the user based on the calculated route.

15 Claims, 4 Drawing Sheets

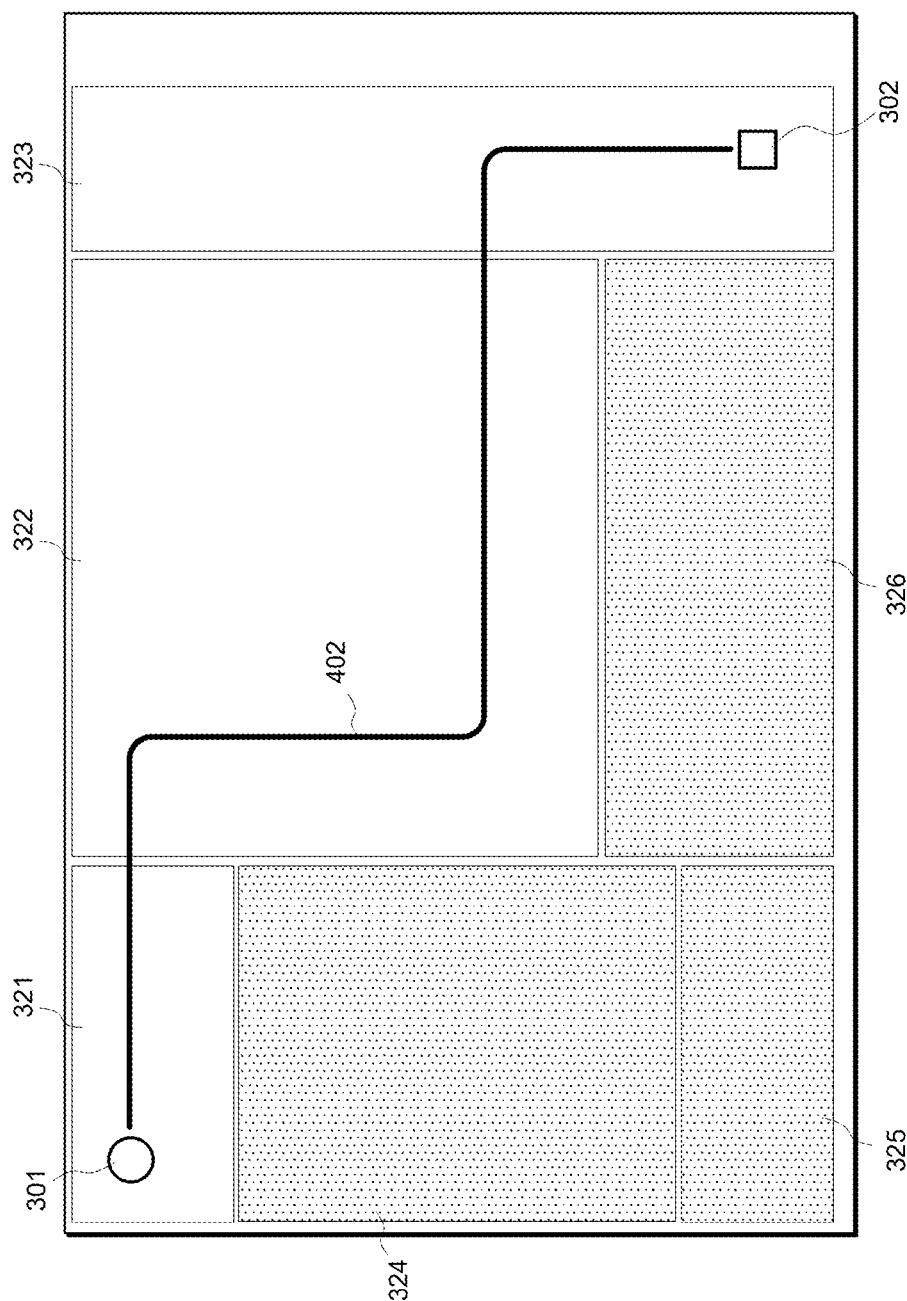

METHODS AND APPARATUS FOR SOCIOECONOMIC ROUTING IN NAVIGATION SYSTEMS

TECHNICAL FIELD

The present disclosure generally relates to navigation systems, such as those employing global positioning system (GPS) navigation. More particularly, the present disclosure relates to routing preferences used in connection with such systems.

BACKGROUND

Navigation systems are commonly incorporated into automobiles, smart-phones, tablet computers, dedicated hand-held units, and a wide range of other electronic devices. Such navigation systems typically employ a satellite-based global positioning system (GPS) to determine the location of the user and to provide route guidance—e.g., a map and/or turn-by-turn directions corresponding to a route extending from a start location (often the user's current location) to an end location or series of locations.

When traveling through an unfamiliar geographical region—for example, a different state or country—presently known navigation system may provide the user with a route that takes the user through or near regions that are dangerous or have a socioeconomic status that is uncomfortably below that to which the user is accustomed. It would therefore be desirable to provide navigation systems that accommodate a user's socioeconomic routing preferences. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements.

FIGS. 3-4 are conceptual diagrams depicting exemplary socioeconomic routing.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

In general, systems and methods in accordance with the subject matter described herein provide socioeconomic routing preferences based on a socioeconomic status that is associated with, for example, a user's residence and/or regions frequently visited by the user. In this way, the user is provided with an increased sense of security and comfort level when traveling in unfamiliar areas.

As a preliminary matter, the various systems and methods described herein may be implemented in the context of any number of known navigation and/or route-mapping systems. Such systems include, for example, hand-held GPS systems, automotive navigation systems, smart-phones running various locationing applications, on-line mapping services (Google Maps, etc.), and the like. For the purposes of example, a navigation system useful in describing the present embodiments will now be described. It will be appreciated, however, that the illustrated system is presented without loss of generality, and without limiting the range of possible applications.

Figure 1:
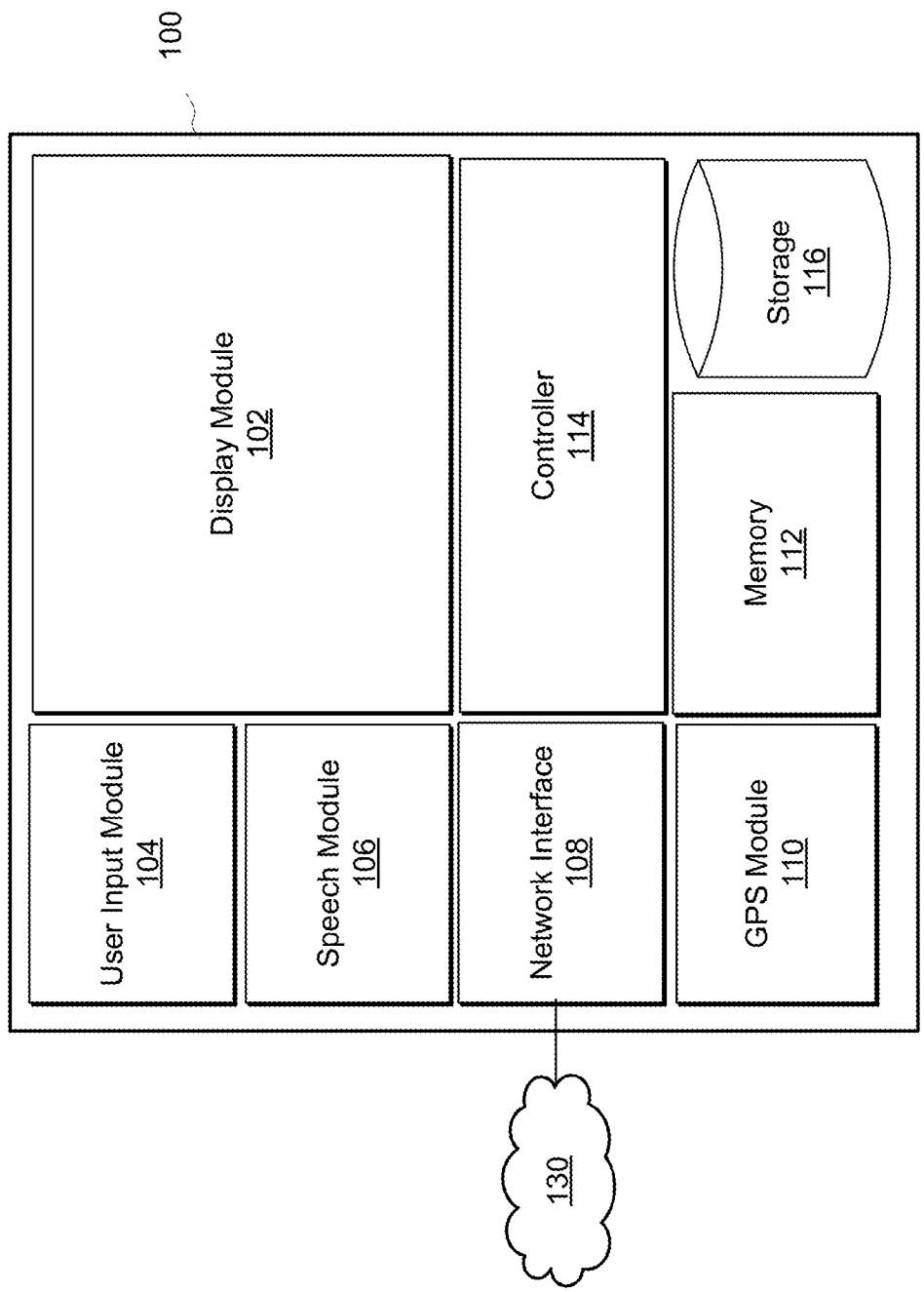
FIG. 1 is a conceptual overview of a navigation device in accordance with one embodiment.

Referring now to FIG. 1, an exemplary navigation system 100 generally includes a display module 102 (including, for example, an LCD and/or touch-screen display), a navigation controller (or simply "controller") 114, memory 112 (e.g., RAM, ROM, etc.), storage 116 (e.g., SSD or hard-disk storage), a speech module 106, a GPS module 110, and a network interface 108 configured to interface with a network 130 (e.g., a cellular network, an 802.11 network, a satellite network, or the like). Additional conventional devices and subsystems (e.g., power supplies and the like) may also be included in navigation system 100, but in the interest of clarity such conventional subsystems are not illustrated in FIG. 1.

As will be described in further detail below, user input module 104 is configured to receive from the user a start location, an end location, and user location information associated with a residence of the user. Controller 114 is configured to determine a socioeconomic routing preference based on a socioeconomic status associated with the user location information and to calculate a route between the start location and the end location based on the socioeconomic routing preference. Display module 102 is configured to then provide route guidance information associated with a route (e.g., between the start location and the desired end location) to the user. The various electronic components, semiconductor devices, displays, and the like that compose navigation system 100 are generally known in the art, and need not be described in detail herein.

Figure 2:
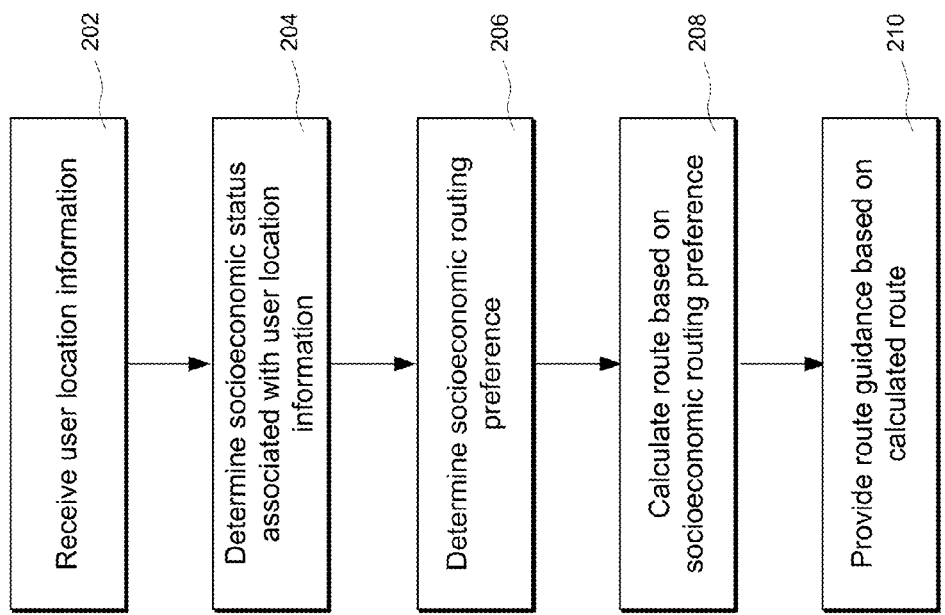
FIG. 2 is a flowchart depicting an exemplary method for providing socioeconomic route guidance.

Referring now to FIG. 2 in conjunction with FIG. 1, an example method for providing route guidance will now be described.

First, the system receives user location information (step 202). This may be accomplished in a variety of ways. For example, the user may be prompted via user input module 104 to enter the data into a physical or virtual keyboard, or to speak aloud the user location information (e.g., in conjunction with a speech recognition system). Alternatively, the user location information may be automatically determined through a suitable locationing process, including GPS (via GPS module 110), WiFi network locationing, or the like. In automotive embodiments, for example, the user location information may be determined when the user enters a home address via the navigation system (a typical start-up procedure). The user location information may be entered during an initialization procedure or manually entered as part of configuration settings available to the user.

Next, in step 204, the system determines a socioeconomic status associated with the user location information. The socioeconomic status may be any metric that characterizes to some degree the absolute or relative economic and social position of individuals living within a particular region. Thus, socioeconomic status may take into account the aggregate income, education, occupation, and the like for individuals living within a particular region. In accordance with some measures of socioeconomic status, a three-level metric is employed (high, middle, low). In others, a continuous real numbers scale is used (e.g., 0.0 to 1.0), while in others, a discrete value is used (e.g., an integer between 1 and 10, inclusive).

Regardless of the granularity of the socioeconomic status value, system 100 has access to a database, look-up table, or the like that includes socioeconomic status information for a large number of geographical regions (including, for example, the region that includes the user's residence). In this regard, the size of the regions may range from relatively large (particular cities, suburbs, zip-codes, etc.) to relatively small (particular neighborhoods, streets, etc.). The information may be compiled in a proprietary manner (as is done by firms specializing in marketing and demographics) or may be based on publically available statistics. The socioeconomic status information may be stored in and retrieved from a variety of locations, e.g., memory 112, storage 116, or via network 130. In some embodiments, only a subset of all available socioeconomic status information is stored locally within system 100 at a particular time, based on the area (e.g., state, country, etc.) in which system 100 is being operated.

Once the socioeconomic status corresponding to the user's residence information is determined, the system then determines a routing preference based on that socioeconomic status (step 206). In one embodiment, the socioeconomic routing preference includes a preference for candidate route segments (i.e., roads, highway segments, or the like) that pass through regions having a socioeconomic status that is within a predetermined range of the socioeconomic status of the user location information. For example, the routing preference may specify a route that passes through regions that have a socioeconomic status equal to or greater than (or fall within a specific range around) that of the user residence information. In other embodiments, the socioeconomic routing preference is further based on a composite socioeconomic status associated with a plurality of the user's frequently visited regions. Stated another way, the system may interactively "learn" the most common route traveled by the user, and then based the routing preference on some measure of the socioeconomic status of that route.

Figure 3:
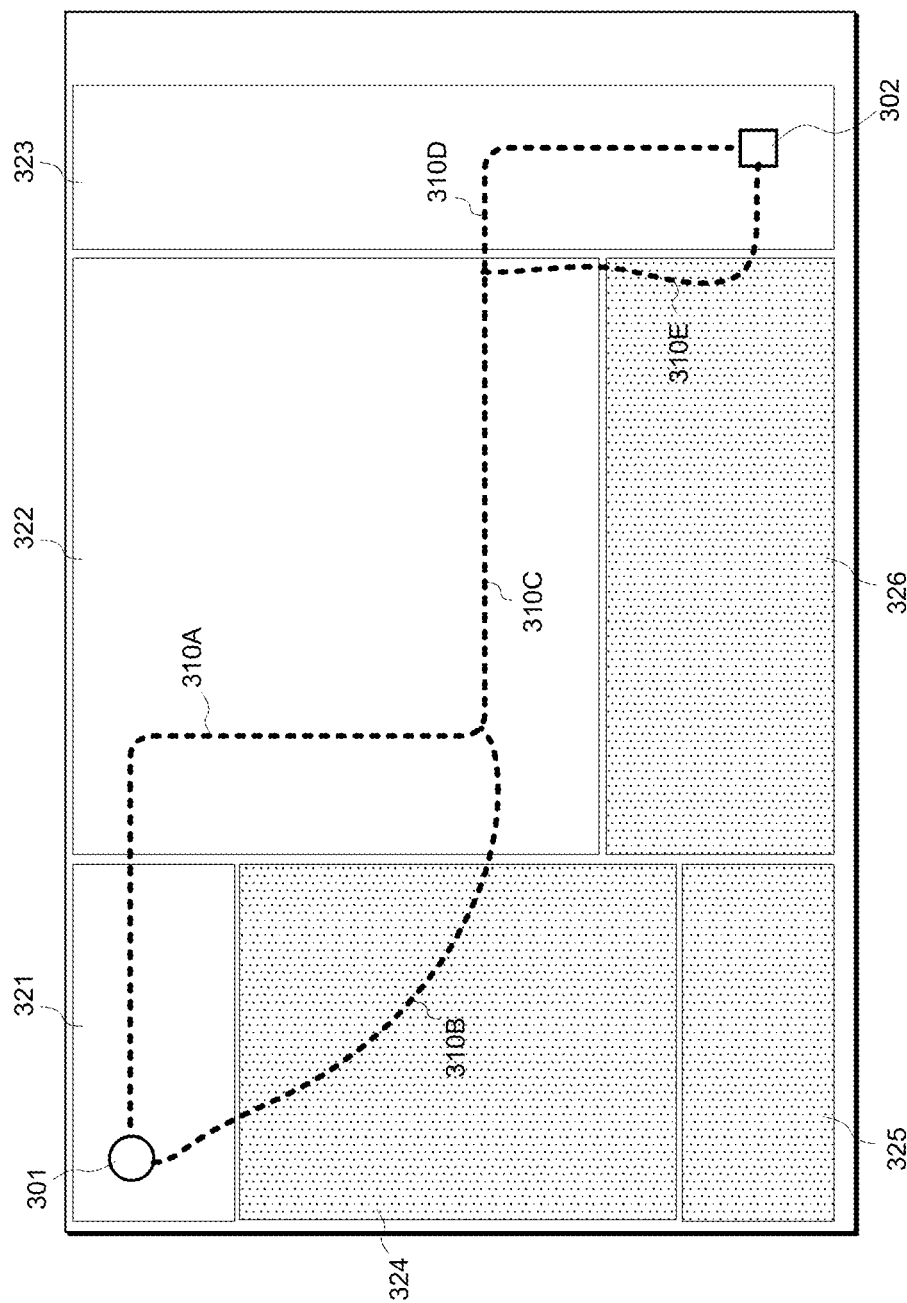

Next, in step 208, a route is calculated based on the socioeconomic routing preference. FIGS. 3 and 4 provide conceptual top-view maps illustrating this process. More particularly, referring to FIG. 3, it is assumed that the user has suitably entered a start location 301 and an end location 302. The system has determined that the best route would include various combinations of five candidate route segments 310— i.e.: route segments 310A, 310B, 310C, 310D, and 310E. Furthermore, the system has determined that each of these route segments passes through one or more regions 321, 322, 323, 324, 325, and/or 326. That is, route segment 310B passes through regions 321, 324, and 322, route segment 310C passes through region 322, and so on.

In this example, it is assumed that regions 324, 325, and 326 have a socioeconomic status that is below that corresponding to the user residence information (indicated by shading), while regions 321, 322, and 323 have a socioeconomic status that is equal to or greater than that corresponding to the user residence information.

Assuming a socioeconomic preference specifying selection of only route segments passing through regions having a socioeconomic status equal to or greater than that of the the user residence information, the system then selects a route consisting only of route segments 310A, 310C, and 310D. The calculated route is illustrated as route 402 in FIG. 4.

In some embodiments, the socioeconomic route preference may be weighed against other common preferences used in traditional navigation systems, such as highway/surface-street preference, quickest vs. shortest route preference, and the like. Furthermore, some embodiment might allow the user select a route from a number of candidate routes, wherein the socioeconomic status of the route is indicated in some way (e.g., via a graphical method as shown in FIG. 3).

Finally, in step 210, route guidance is provided to the user based on the calculated route. This route guidance might take the form of a map, graphical turn-by-turn directions, audio turn-by-turn directions (e.g., via speech module 106), or any other suitable method.

In summary, what has been provided is a system that provides socioeconomic routing preferences based on a socioeconomic status that is associated with, for example, a user's residence and/or regions frequently visited by the user. In this way, the user is provided with an increased sense of security and comfort level when traveling in unfamiliar areas. Unlike simplistic systems that, for example, merely route around known high crime areas, the present system is user-centric, providing a route that is custom-tailored to the user based on his or her own socioeconomic preferences.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method of providing routing information to a user, the method comprising:
   receiving user location information associated with a residence of the user;
   determining a socioeconomic routing preference based on a socioeconomic status associated with the user location information;
   calculating a route between a start location and an end location based on the socioeconomic routing preference, wherein the end location does not correspond to the residence of the user; and
   providing route guidance, via a display, to the user based on the calculated route; wherein the route comprises a plurality of route segments selected from a plurality of candidate route segments passing through a plurality of regions having an associated socioeconomic status; the socioeconomic routing preference includes a preference for candidate route segments that pass through regions having a socioeconomic status that is substantially equal to or greater than the socioeconomic status of the user location information; and the socioeconomic routing preference is further based on a composite socioeconomic status associated with a plurality of the user's frequently visited regions.

2. The method of claim 1, wherein providing the route guidance includes at least one of displaying an interactive map and providing audio turn-by-turn directions.

3. The method of claim 1, wherein receiving the user location information includes prompting the user to enter an address corresponding to the residence of the user during a navigation system initialization procedure.

4. The method of claim 1, wherein the socioeconomic routing preference includes a preference for candidate route segments that pass through regions having a socioeconomic status that is within a predetermined range of the socioeconomic status of the user location information.

5. The method of claim 1, further including downloading, over a network, data specifying the socioeconomic status associated with the plurality of regions.

6. A navigation system comprising:
a controller;
a display module coupled to the controller, the display module configured to display route guidance information associated with a route; and
a user input module coupled to the controller, the user input module configured to receive from the user a start location, an end location, and user location information associated with a residence of the user;
wherein the controller is configured to determine a socioeconomic routing preference based on a socioeconomic status associated with the user location information and to calculate a route between the start location and the end location based on the socioeconomic routing preference, wherein the end location does not correspond to the residence of the user; and
wherein the route comprises a plurality of route segments selected from a plurality of candidate route segments passing through a plurality of regions having an associated socioeconomic status; the socioeconomic routing preference includes a preference for candidate route segments that pass through regions having a socioeconomic status that is substantially equal to or greater than the socioeconomic status of the user location information; and the socioeconomic routing preference is further based on a composite socioeconomic status associated with a plurality of the user's frequently visited regions.

7. The navigation system of claim 6, further including a speech module configured to enunciate audio turn-by-turn directions associated with the route.

8. The navigation system of claim 6, wherein the controller is further configured to prompt the user to enter an address corresponding to the residence of the user during an initialization procedure.

9. The navigation system of claim 6, wherein the controller is configured to download, over a network, data specifying the socioeconomic status associated with the plurality of regions.

10. The navigation system of claim 6, wherein the socioeconomic routing preference is further based on a composite socioeconomic status associated with a plurality of the user's frequently visited regions.

11. A non-transitory computer-readable medium embodying software instructions, the software instructions configured to instruct a controller to perform the steps of:
determining a socioeconomic routing preference based on a socioeconomic status associated with user location information;
calculating a route between a start location and an end location based on the socioeconomic routing preference, wherein the end location does not correspond to the residence of the user; and
providing route guidance, via a display, to the user based on the calculated route; wherein the route comprises a plurality of route segments selected from a plurality of candidate route segments passing through a plurality of regions having an associated socioeconomic status; the socioeconomic routing preference includes a preference for candidate route segments that pass through regions having a socioeconomic status that is substantially equal to or greater than the socioeconomic status of the user location information; and the socioeconomic routing preference is further based on a composite socioeconomic status associated with a plurality of the user's frequently visited regions.

12. The non-transitory computer-readable medium of claim 11, wherein the software instructions further instruct the controller to provide turn-by-turn directions.

13. The non-transitory computer-readable medium of claim 11, wherein the software instructions further instruct the controller to prompt a user to enter an address during a navigation system initialization procedure, and to base the user location information on the address.

14. The non-transitory computer-readable medium of claim 11, wherein the software instructions further instruct the controller to download, over a network, data specifying the socioeconomic status associated with the plurality of regions.

15. The non-transitory computer-readable medium of claim 11, wherein the socioeconomic routing preference includes a preference for candidate route segments that pass through regions having a socioeconomic status that within a predetermined range of the socioeconomic status of the user location information.

* * * * *